3,271,109
PIGMENTARY SILICON CARBIDE
Eugene J. Mezey and Hans H. W. Schwantje, Wadsworth, Ohio, assignors to Pittsburgh Plate Glass Company, Pittsburgh, Pa., a corporation of Pennsylvania
No Drawing. Filed Apr. 11, 1963, Ser. No. 272,236
11 Claims. (Cl. 23—208)

This invention involves pigmentary silicon carbide. More particularly, it relates to the production of finely divided silicon carbide characterized by texture, particle size and particle size distribution rendering it effective as a pigment in the manufacture of surface coatings and in other compositions (e.g., rubber, natural and synthetic, and paper) where fillers or pigments are conventionally employed.

Silicon carbide because of its hardness is widely used as an abrasive, e.g., in grinding wheels, according to the literature. It has not, however, gained acceptance and been commercially employed as a prime pigment, i.e., a pigment which has as its primary function impartation of hiding power in paints or optical properties in paper. This despite the high index of refraction, about 2.65, which is reported for silicon carbide. Attempts to use such silicon carbide as pigments indicate they suffer in performance apparently because they are comprised of irregularly shaped particles, and/or include platelets or needle-like particles and/or are highly aggregated. If used as a prime pigment for paints or other surface coating materials, the resulting films are gritty, abrasive and lack adequate texture. Moreover, such silicon carbide does not provide films with satisfactory hiding power, e.g., the silicon carbide fails to fulfill the major function of a prime pigment.

According to the present invention, there is provided pigmentary silicon carbide which may be used, for example, to satisfy the requisites of a prime pigment in paints (or other surface coating materials). These silicon carbide pigments are characterized by the fact that their particles are of substantially spherical shape. Thus, silicon carbide pigments prepared pursuant to this invention are comprised of sperical particles having a mean number particle size between about 0.05 and 0.4 micron. Few if any particles are less than 0.005 micron while ideally the pigment is substantially free of particles greater than 0.95 micron, i.e., for all practical purposes the pigment particles are all within 0.005 to 0.95 micron. A minimum of 80 per cent, desirably at least 90 per cent (determined on a number basis) of the particles of the pigment are coarsely sperical in shape, i.e., the predominant particle shape is spherical. Particle aggregates greater than 1.0 micron are rarely present, to the extent that at least 90 per cent and preferably better than 95 per cent of the pigment particles are smaller than 1.0 micron.

Silicon carbide pigments provided pursuant to this invention are often nearly colorless, e.g., substantially white, or light gray. They are chemically quite pure, at least to the extent that they have a positive charge at a pH below 4 as determined by electrophoretic measurements (denoting substantially pure silicon carbide substantially free of silica on the particle surface). Electrophoresis is the migration of a suspension or dispersion of small solid particles in a solvent caused by the application of an electric field across the suspension.

Pigmentary silicon carbide is produced pursuant to this invention by a relatively simple process from silicon oxide and carbon. Such process, as herein contemplated, does not depend upon grinding or other mechanical procedures to attain products having particles in the pigmentary size range, e.g., less than 1.0 micron. Instead, the process of this invention leads directly to the preparation of finely divided pigmentary silicon carbide.

It now has been discovered that silicon carbide in pigmentary form may be produced from silicon oxide, notably silicon dioxide, and carbon by effecting reaction at a temperature in excess of 1150° C., preferably between about 1400° C. and 1650° C., but rarely above 3000° C., by controlling the size of the carbon particles and mole ratio of carbon to silicon oxide. Thus, it is found that the particle size of the silicon carbide may be set by controlling properly these variants.

Typically, in the performance of this invention, a suitable reactor (usually a closed vessel) is charged with both carbon and silicon dioxide, usually in a mole ratio of 1 to 10 moles of carbon per mole of silicon dioxide, with the particular ratio being chosen to obtain both the best yield and desired particle size as hereinafter discussed. Carbon is in the form of small particles (preferably loosely bound) sized from 0.005 or 0.05 to 1.5 microns, preferably between 0.3 to 0.6 micron. The charge is heated to 1150° C. or higher and subjected to a gaseous atmosphere which is inert in the sense it avoids formation of products other than silicon carbide.

In a preferred embodiment, the gaseous atmosphere has imparted thereto motion and hence has a velocity component. Desirably, the gas flow rate on entry in the reaction vessel is 50 or more (but rarely greater than 2000) centimeters per minute computed by dividing the square centimeter cross-sectional area (as measured perpendicular to the flow of the gas) of the reaction vessel into the gas volume in cubic centimeters at 25 C. per minute fed to the reactor and multiplying the quotient by the proportion of the gas volume at reaction vessel temperature to the gas volume at 25° C. For the purposes of this computation, the inert gas is assumed to behave as an ideal gas and the proportion of gas volume is computed as proportional to the absolute temperatures.

Desirably, the gas flows in intimate contact with (as over and/or through and/or between) the carbon particles, usually having a sweeping effect. This involves, for example, passing a stream of inert gas through the zone in which the carbon particles are disposed at a velocity which is substantially uniform over the cross-section of the zone measured perpendicular to the flow direction of the stream. Argon and helium are especially suitable, although any inert gas is suitable for establishing the atmosphere in contact with the reactants, e.g., that is, any gas which does not produce a product other than silicon carbide. Such gases include neon, carbon monoxide, vapors of aliphatic hydrocarbons such as methane, ethane, propane, ethylene and propylene, as well as mixtures. Nitrogen or nitrogen-containing gases (e.g., ammonium or amines) compete with carbon for silicon to produce nitrides of silicon rather than silicon carbide.

As hereinabove mentioned, the particle size of the carbon which is employed in formation of the silicon carbide has a direct bearing on the pigmentary nature of the product. It has been found that the particle size of the silicon carbide in the contemplated invention approximates, but is somewhat smaller than, the size of the carbon particles. For example, when the carbon particles have an average (mean) number size of from 0.25 micron to 0.3 micron, the silicon carbide's average number particle size ranges from about 0.10 micron up to 0.22 micron.

Besides the carbon particle size which exerts a primary influence on the silicon carbide particle size, the mole ratio of carbon to silicon oxide influences particle size. Typically, the higher the carbon to silicon oxide mole ratio, the smaller the particle size of the silicon carbide. As discussed hereinafter, the mole ratio also has a bearing on yield.

Useful in general are oxides of silcon including notably silicon dioxide (silica) and silicon monoxide. Other lower oxides including "silicon oxide equivalents" and silicon-oxygen-carbon compounds (gaseous or solid) may be reacted with carbon pursuant to this invention. An illustrative "silicon oxide equivalent" is the oxide composition provided by an equimolar mixture of silicon and silicon dioxide.

The process is carried out at about prevailing atmospheric pressure, although superatmospheric pressures of up to 3 atmospheres or higher and subatmospheric pressures as low as 0.25 atmosphere or lower are readily employed.

Reactor charges with varying proportions of silicon oxide and carbon are within the purview of this invention, and the particular ratio of reagents is chosen consistent with its impact on particle size of product (hereinbefore discussed) and yield. Commonly, the reaction mixture contains at least one mole (often up to 15 moles) of carbon per mole of silicon, and an additional mole of carbon for each mole of oxygen. Best yields ensue with from 4 to 5 moles of carbon per mole of silica. Thus, using silica, 30 to 70 percent stoichometric excess carbon is recommended, the reaction theoretically requiring 3 moles of carbon per mole of silica.

While the foregoing has described the invention primarily in connection with oxides of silicon, such as silica, silica monoxide, it is not limited thereto. Other oxides of silicon, organic or inorganic, whether they be binary, ternary, quaternary, etc., are useful. Typical oxides useful in the performance of this invention thus include calcium silicate, alumino-silicates, sodium silicates and bauxite; organo silicates such as ethyl silicate, methyl silicate, propyl silicate, phenyl silicate; and alkoxy and/or aryloxy silanes, such as monomethoxy silane, dimethoxy silane, phenyloxy silane and/or diphenyloxy silane. Minerals such as quartz, feldspars, amorphous silicas (diatomaceous earths), amphiboles, pyroxene, micas, and olivines and similar silica containing minerals such as are found in quartz, sand, quartzites, pegmatite, granite, clays and the like are of use. With organo silicates and organo-oxy silanes, the amount of carbon particles employed during the reaction may be reduced since the organo moieties of the silicate can be employed for partially supplying carbon (typically less than 50 percent of the molar quantity of Si employed). It may be hypothesized that any source of silicon (including elemental silicon) is useful to generate the silicon content of the carbide.

In an illustrative preferred embodiment, the silica and carbon particles are mixed to form a loose intimate dispersion. Such intimate mixtures are provided very conveniently by dispersing both the silica and the carbon particles in alcohol, typically a mixture of isopropyl alcohol and ethanol. After drying the resulting alcoholic slurry, a fine intimate dispersion is obtained. When mixing in this fashion, the silica (or other oxide of silicon) preferably is of fine particle size (e.g., less than 1 micron, usually between 0.005 and 0.5 micron), thereby enhancing dispersion. Larger size particles can be utilized but do not disperse as effectively in this type of operation.

It is possible to perform this invention with silica by first generating silicon monoxide and converting it to silicon carbide. Thus, one contemplated embodiment generates silicon monoxide from a mixture (typically equimolar) of silica and carbon particles (without regard for particle size) heated above 1150° C. So generated gaseous silicon monoxide is then transported into contact (usually in a different zone or reactor from that in which it was generated) with a bed of carbon particles having the aforementioned particle size (through which inert gas is passed) and subjected to silicon carbide forming conditions.

The inert gas used in the silicon carbide forming step may be fed in admixture with silicon monoxide. Conveniently, this can be accomplished by using the inert gas to transport the silicon monoxide gas from its generation source to the silicon carbide forming zone.

Silicon carbide product in this procedure, once removed from the reaction zone, is cooled usually to ambient temperatures, viz., 25° C. Carbon may first, however, be removed at high temperature. Moreover, cooled product may then be heated to about 400° C. (a range of 350° C. to 800° C.) to oxidize residual carbon. The product may then be subjected to a mineral acid or alkali treatment to separate any oxide of silicon on the surface of the particles.

In some instances, oxides of silicon form on the silicon carbide surface, e.g., when the particulate silicon carbide is removed from the reaction zone while at high temperature in contact with an oxygen containing atmosphere, e.g., air. Removal of these oxide contaminants is usually desirable. With oxide type coating, this can be accomplished by careful washing with mineral acid, notably hydrofluoric acid, or a strong alkaline solution, such as a caustic soda solution, sodium carbonate or bicarbonate solution, sodium peroxide solution, potassium hydroxide solution, and quaternary ammonium bases such as benzyl trimethyl ammonium hydroxide and/or tetramethyl ammonium hydroxide, or acid salt solutions, such as ammonium hydrogen fluoride, potassium hydrogen fluoride and fluoroboric acid.

An alternative procedure involves a flotation process in which the silicon carbide pigment removed from the reaction zone is ball milled in a hydrocarbon, such as kerosene, and then mixed with water and centrifuged, thereby to form two fractions, a water layer and a hydrocarbon layer. The fraction collected in the hydrocarbon layer is more concentrated in carbon. Silicon carbide concentrates in the fraction collected in the water layer from which it may then be isolated by evaporation. The SiC product may then be oxidized to remove any residual carbon concentration by heating at a temperature typically above 400° C. and then is given the oxide of silicon removal treatment described above.

The following examples illustrate the manner in which this invention may be performed.

*Example I*

The silica employed in this example had the following physical and chemical properties:

| | |
|---|---|
| Silica content (moisture-free basis) | 99.9 percent minimum. |
| Free moisture (105° C.) | 1.5 percent maximum. |
| Ignition loss (1000° C.) | 1.0 percent maximum. |
| Particle size range | 0.015 to 0.020 micron. |
| Surface area (nitrogen adsorption) | 200 ±25 square meters per gram. |
| Specific gravity | 2.2. |
| Color | White. |
| Refractive index | 1.46. |
| pH (10 percent aqueous dispersion) | 3.6 to 4.2. |
| Oil absorption (Gardner method) | 150 pounds oil per 100 pounds pigment. |
| Bulking value | 0.0546 gallons per pound. |

The carbon utilized in this example was a medium (produced by well known cracking of natural gas) thermal carbon black with substantially all its particles sized between 0.27 to 0.33 micron. It had the following typical analysis:

| | Percent by weight |
|---|---|
| Carbon | 99.6 |
| Hydrogen | 0.30 |
| Ash | 0.18 |
| Sulfur | 0.03 |
| Oxygen | Less than 0.07 |

Five (5) grams of the silica and 3 grams of the carbon black were fed to a Waring Blendor and agitated for about 5 minutes. This mixture was charged to a nine-inch long graphite reactor tube having a ¾-inch inside diameter after which both ends were plugged with porous carbon. The tube was inserted into an electric furnace heated to 1500° C. Argon gas was fed to one end of the plugged graphite tube at a rate of 250 milliliters per minute (determined at 25° C.) for 2 hours during which time the tube was at 1500° C. The gas velocity in the initial portion of the interior of the reactor tube was about 5.22 centimeters per second, computed assuming argon gas acts as an ideal gas and calculating its volume at 1500° C. During this period, argon and carbon monoxide were removed from the other end of the tube.

After the two-hour period, the tube was withdrawn from the furnace and was allowed to cool to room temperature, about 25° C. All of the solid material within the tube was removed, placed in a quartz evaporating dish and post-treated by heating at 750° C. for 16 hours in an air atmosphere. After cooling to room temperature, it was placed in a Teflon evaporating dish and sufficient hydrofluoric acid was added to form a liquid layer over the solid material. The Teflon dish was then heated to between 100° C. and 110° C. to evaporate all of the solution contained in the dish. The hydrofluoric acid treatment was repeated a second time. To the resulting residue in the Teflon dish was added water to thereby form a water layer over the residue. The dish was then heated again between 100° C. and 110° C. to drive off all of the liquid present in the dish. This water and evaporation treatment was repeated a second time.

This silicon carbide (in beta crystal form) pigment was characterized by being composed of particles all of which were primarily spherical. It had a mean number particle size of 0.21 micron, and had all of its particles no smaller than 0.1 micron and no larger than 0.5 micron. Aggregates of particles (groupings of more than one particle) sized greater than 1.0 micron were not found to be present.

This pigment had a tinting strength of 900 when compared with a rutile titanium dioxide pigment having a tinting strength of 1750 by the procedure of ASTM D–332–36 ("1949 Book of A.S.T.M. Standards," Part 4, page 31, published by the American Society for Testing Materials, Philadelphia 3, Pennsylvania).

*Example II*

Using the apparatus and procedure described in Example I, 5 grams of the silica described in Example I was mixed with 8 grams of a fine thermal type carbon black (produced by thermal cracking of natural gas mixed with hydrogen on hot refractory) having a particle size of between 0.13 and 0.17 micron. The carbon black had the following typical analysis:

| | Percent by weight |
|---|---|
| Carbon | 99.56 |
| Hydrogen | 0.30 |
| Ash | 0.05 |
| Sulfur | 0.03 |
| Oxygen | 0.10 |

Silicon carbide pigment so produced after post-treatment had a mean number particle size of 0.09 micron and a particle size distribution of from 0.03 to 0.3 micron. The pigment particles were all coarsely spherical and the pigment was free of aggregates larger than 1.0 micron. It had a tinting strength of 800, when compared with a titanium dioxide pigment having a tinting strength of 1750 as determined by ASTM D–332–36.

*Example III*

Five grams of the silica described in Example I and 5 grams of the carbon black described in Example II were slurried in isopropyl alcohol until the slurry attained the consistency of a gel. After heating in a vented furnace to remove residual alcohol, the dried gel was agitated for one minute in a Waring Blendor. The resulting mixture was then placed in the reactor described in Example I and heated to 1450° C. for 2 hours, while helium was fed (rather than argon) as in Example I.

The silicon carbide pigment prepared in this manner was comprised of particles spherical in shape which had a diameter particle size in the range of 0.08 to 0.55 micron, with 80 number percent of the pigment being from 0.1 to 0.2 micron in diameter.

Pigmentary silicon carbide produced pursuant to the methods herein described is notable by the fact that its particles are characteristically substantially (roughly) spherical in shape and less than 1.0 micron, ideally about 0.25 to 0.3 micron in average diameter.

Particle size as herein used is that particle size determined from electron photomicrographs of magnifications typically 25,000 times greater than actual size, from which only two dimensions are clearly determinable. However, the three-dimensional shape of an individual particle is determined from the typical shape pictured and from electron photomicrographs of individual particles shadowed with palladium at a 45 degree angle. Such shadowed electron photomicrographs showed the particles to be spherical or nearly spherical. For example, if all of the particles appear as rough and irregular (coarse) spheres, then it is assumed (and validly so) that the third dimension of the particles, not shown on the picture, is equal to the average dimension of the other two dimensions shown. In the case of particles shaped in the form of rod, bars and needles (as are some of the silicon carbide products used in abrasives) more than two dimensions of some of the particles are pictured. Thus, a three-quarter view of some particles clearly indicates the size of three dimensions. The size of individual particles pictured is measured (by comparison) in microns and from a tabulation of the measurements in the sample, a mean number particle size and particle size distribution are determined.

Pigmentary silicon carbide comprised of particles which are coarsely (substantially) spherical demonstrate valuable pigment qualities, e.g., have high hiding capability in a film or plastic article. This means that they are capable of providing hiding power per unit weight of pigment loading and gloss befitting a commercially acceptable paint pigment.

Although the examples illustrate production of beta silicon carbide crystals, the invention also contemplates alpha silicon carbide pigment. For some pigment uses, the alpha form is preferred. The alpha crystal form may be obtained by heating the beta silicon carbide pigment above 2100° C. until it converts to the alpha crystal form. Little if any particle size change takes place in connection with such change from beta to alpha crystal form. The heating is preferably conducted in a non-oxidizing inert atmosphere, though a reducing atmosphere may be employed.

The silicon carbide pigments of this invention find optimum usage in polymeric resinous surface coating compositions. In addition, those materials exhibit excellent characteristics in a plastic composition (molded or fibrous) as a filler or delustering agent (particularly for fibers). These filler materials may be incorporated into any cellulosic and/or vinyl chloride-vinyl alcohol or acetate lacquer, alkyd resin, polyurethane, polyester (e.g., polyethylene terephthalate, or a copolymer of maleic acid and styrene cross-linked with glycol or glycerine), polyamides such as polycaproamide or polycaprolactam (nylon-6), polyhexamethylene adipamide (nylon-6,6), polyhexamethylene sebacamide (nylon-6,10), polyoxymethylenes (polyacetal resins) formed by the polymerization of formaldehyde, thermoplastic and thermosetting acrylic acid polymers such as copolymers or acrylic acid and acrylonitrile or acrylamide, which is further reacted with formaldehyde, phenyl formaldehyde resins, epoxy resins such as the reaction product of alkylidene bisphenols (such as Bisphenol A) and epichlorohydrin, polyesters thereof and silicone resins and elastomers, e.g., the polymethylsiloxanes. In addition, these materials may be utilized in hydrocarbon plastics, such as polystyrene, high, medium and low density polyethylene, polypropylene, cis-polybutadiene, and copolymers and terpolymers of butadiene and acrylates, acrylonitrile or styrene. Moreover, these pigments may be utilized in oil-based paints, to wit, paints free of synthetic resins and which are based on, e.g., linseed oil, tung oil, and other drying oils.

A very desirable use for this pigment is as a reinforcing filler or extender in the manufacture of rubber products, such as rubber tires, crepe soles, etc. Thus, 1 to 200 parts by weight of the silicon carbide pigment of this invention may be introduced into a conventional natural or synthetic (GR–S) rubber composition per 100 parts of rubber and vulcanized by known procedures to give a high strength rubber product useful in the tire manufacturing and novelty products field. It is desirable that the silicon carbide utilized in the compounding of rubber as a reinforcing filler have a mean number particle size below 0.30 micron, preferably below 0.15 micron.

This filler may be introduced into the rubber or in paints and plastics using recognized dispersing techniques such as illustrated in the following example:

*Example IV*

One-half (½) gram of the silicon carbide pigment of Example II was stirred into a one milliliter mineral spirits solution of an alkyd resin (50 percent by weight of resin) made by condensation of the following composition:

| | Percent by weight |
|---|---|
| Phthalic anhydride | 27 |
| Linseed oil | 56 |
| Glycerol | 17 |

This mixture was then ground on a Hoover muller for 50 revolutions with an applied pressure of 150 pounds per square inch to give a paste which was scraped with a spatula and diluted with one milliliter more of the aforementioned resin solution. Mixing was continued on a muller plate to form a resin-pigment blend and thereafter 0.1 percent lead naphthenate and 0.05 percent cobalt naphthenate, basis the weight of blend, were thoroughly mixed in the blend. The paint composition was thereafter removed from the muller plates with a spatula and was drawn down on an aluminum plate with a 0.003 inch clearance drawbar to form a 0.003 inch film on the plate. The product was left to air dry and was found to have excellent gloss characteristics and hiding power closely paralleling that of the best quality titanium dioxide pigment on the market.

Although the invention has been described by reference to specific details, it should be understood it is not intended the invention be construed as limited to these details except insofar as they appear in the following claims.

We claim:

1. A process for producing pigmentary silicon carbide which comprises reacting an oxide of silicon with carbon particles of from 0.005 to 1.5 microns in size while said carbon is in the form of particles in a flowing inert gaseous atmosphere whereby to form pigmentary silicon carbide.

2. A process for producing particulate silicon carbide which comprises reacting at a temperature in excess of 1150° C. an oxide of silicon with carbon particles of from 0.005 to 1.5 microns in size while said carbon is in the form of particles in a flowing inert gaseous atmosphere whereby to form pigmentary silicon carbide.

3. The process of claim 2 wherein the gaseous atmosphere comprises argon.

4. The process of claim 2 wherein the gaseous atmosphere comprises helium.

5. The process of producing pigmentary silicon carbide which comprises providing loosely bound carbon particles in a defined zone, passing a stream of inert gas through the zone from one end thereof at a velocity which is substantially uniform over the cross-section of the zone measured perpendicular to the flow direction of said stream and contacting the particles with said stream while said particles are in contact with an oxide of silicon whereby to form pigmentary silicon carbide and removing said inert gas from the zone.

6. The process of producing pigmentary silicon carbide which comprises providing loosely bound carbon particles sized from about 0.05 to 1.5 microns in an enclosed zone at a temperature in excess of 1150° C., passing a stream of inert gas into said zone from one end thereof at a velocity which is substantially uniform across the cross-section of the zone measured perpendicular to the flow direction of said stream and contacting said particles with said stream while said particles are in contact with an oxide of silicon whereby to form pigmentary silicon carbide and removing said inert gas from said zone remote from its introduction.

7. A method for producing pigmentary silicon carbide having a mean number particle size of from 0.05 to 0.4 micron comprising reacting at elevated temperatures above 1150° C. silicon oxide with carbon while carbon is in the form of particles sized between 0.05 and 1.5 microns whereby to form pigmentary silicon carbide of a particle size approximating the particle size of the carbon particles.

8. The method of claim 7 wherein the silicon oxide is silica.

9. The method of claim 7 wherein a mixture of silica and carbon containing 4 to 5 moles of carbon per mole of silica is heated to the elevated temperature and reacted.

10. A novel particulate composition of pigmentary silicon carbide, the silicon carbide content of which consists of silicon carbide particles, at least 80 percent, on a number basis, of which particles are substantially spherical and have a mean number particle size between 0.05 and 0.4 micron.

11. As a novel pigmentary composition of pigmentary silicon carbide, the silicon carbide content of which consists of particles, at least 80 percent, on a number basis, of which particles are substantially spherical particles having a mean number particle size between 0.05 and 0.4 micron and is comprised of particles sized from 0.005 to 0.95 micron.

References Cited by the Examiner

UNITED STATES PATENTS

| 875,673 | 12/1907 | Potter | 23—208 |
| 966,399 | 8/1910 | Higgens | 23—208 |
| 1,940,308 | 12/1933 | Kelley | 23—208 |
| 2,178,773 | 11/1939 | Benner et al. | 23—208 |
| 3,129,188 | 4/1964 | Sowman et al. | 23—208 X |
| 3,166,380 | 1/1965 | Kuhn | 23—208 |
| 3,175,884 | 3/1965 | Kuhn | 23—208 |

UNITED STATES PATENTS

| 748,808 | 5/1956 | Great Britain. |
| 828,211 | 2/1960 | Great Britain. |

OSCAR R. VERTIZ, *Primary Examiner.*

MAURICE A. BRINDISI, *Examiner.*

G. L. OZAKI, *Assistant Examiner.*